(12) United States Patent
Bates et al.

(10) Patent No.: US 7,986,602 B2
(45) Date of Patent: Jul. 26, 2011

(54) APPARATUS AND METHOD TO SET A ROTATION RATE FOR AN OPTICAL AND HOLOGRAPHIC DATA STORAGE MEDIUM

(75) Inventors: Allen Keith Bates, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 12/030,076

(22) Filed: Feb. 12, 2008

(65) Prior Publication Data

US 2009/0201783 A1    Aug. 13, 2009

(51) Int. Cl.
G11B 7/00    (2006.01)

(52) U.S. Cl. .................................. 369/103; 369/47.37

(58) Field of Classification Search .................. 369/103, 369/47.37, 47.38
See application file for complete search history.

(56) References Cited

U.S. PATENT DOCUMENTS

| | | | |
|---|---|---|---|
| 5,635,267 A * | 6/1997 | Yamada et al. ............ | 428/64.4 |
| 5,675,570 A | 10/1997 | Ohira et al. | |
| 6,625,100 B2 | 9/2003 | Edwards | |
| 6,690,629 B1 * | 2/2004 | Hayashi ............ | 369/44.29 |
| 6,738,322 B2 | 5/2004 | Amble et al. | |
| 6,850,345 B2 | 2/2005 | Edwards et al. | |
| 6,940,792 B1 * | 9/2005 | Watanabe ............ | 369/47.38 |
| 2004/0001400 A1 | 1/2004 | Amble et al. | |
| 2005/0243699 A1 | 11/2005 | Noda et al. | |
| 2006/0109774 A1 | 5/2006 | Horimai et al. | |
| 2006/0181999 A1 | 8/2006 | Knittel et al. | |

OTHER PUBLICATIONS

Hampshire, "Holographic storage: Virtual reality?", ZDNet UK, Nov. 15, 2005.

* cited by examiner

Primary Examiner — Adam R Giesy
(74) Attorney, Agent, or Firm — Dale F. Regelman; Quarles & Brady LLP

(57) ABSTRACT

A method to set a rotation rate for an optical holographic data storage medium by determining if the optical storage layer comprises an alternating series of lands and grooves. If the optical storage layer does not comprise an alternating series of lands and grooves, the method rotates the optical holographic data storage medium at a rotation rate based upon a data acquisition rate for pit-recorded information. If the optical storage layer comprises an alternating series of lands and grooves and the distance between alternating grooves increases as a function of the distance from said center point, then the method rotates the optical holographic data storage medium at a constant angular velocity. If the distance between alternating grooves does not increase as a function of the distance from said center point, then the method rotates the optical holographic data storage medium at a constant linear velocity.

20 Claims, 10 Drawing Sheets

APPARATUS AND METHOD TO SET A ROTATION RATE FOR AN OPTICAL AND HOLOGRAPHIC DATA STORAGE MEDIUM

FIELD OF THE INVENTION

This invention relates to an apparatus and method to set a rotation rate for an optical and holographic data storage medium.

BACKGROUND OF THE INVENTION

In holographic information storage, an entire page of information is stored at once as an interference pattern within a thick, photosensitive material comprising a holographic data storage layer. This is done by intersecting two coherent laser beams within the storage layer. The first, called the data beam, contains the information to be stored; the second, called the reference beam, is designed to be simple to reproduce, for example a simple collimated beam with a planar wavefront.

The resulting interference pattern causes chemical and/or physical changes in the photosensitive medium: a replica of the interference pattern is stored as a change in the absorption, refractive index, or thickness of the photosensitive medium.

When the stored interference pattern is illuminated with one of the two waves that were used during recording, some of this incident light is diffracted by the stored interference pattern in such a fashion that the other wave is reconstructed. Illuminating the stored interference pattern with the reference wave reconstructs the data beam, and vice versa.

Optical drives, including CD and DVD drives, detect variations in the optical properties in the surface of an optical data storage layer. Such optical drives direct a light beam onto that surface and detect either the presence or absence of a corresponding reflected beam.

SUMMARY OF THE INVENTION

Applicants' invention comprises an apparatus and method to set a rotation rate for an optical holographic data storage medium comprising a holographic data storage layer and an optical data storage layer. If the optical storage layer does not comprise an alternating series of lands and grooves, the method establishes a data acquisition rate for pit-recorded information, and rotates the optical holographic data storage medium at a rotation rate based upon the data acquisition rate for pit-recorded information.

If the optical storage layer comprises an alternating series of lands and grooves, then the method determines if the distance between alternating grooves increases as a function of the distance from said center point. If the distance between alternating grooves increases as a function of the distance from said center point, then the method rotates the optical holographic data storage medium at a constant angular velocity. If the distance between alternating grooves does not increase as a function of the distance from said center point, then the method rotates the optical holographic data storage medium at a constant linear velocity.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
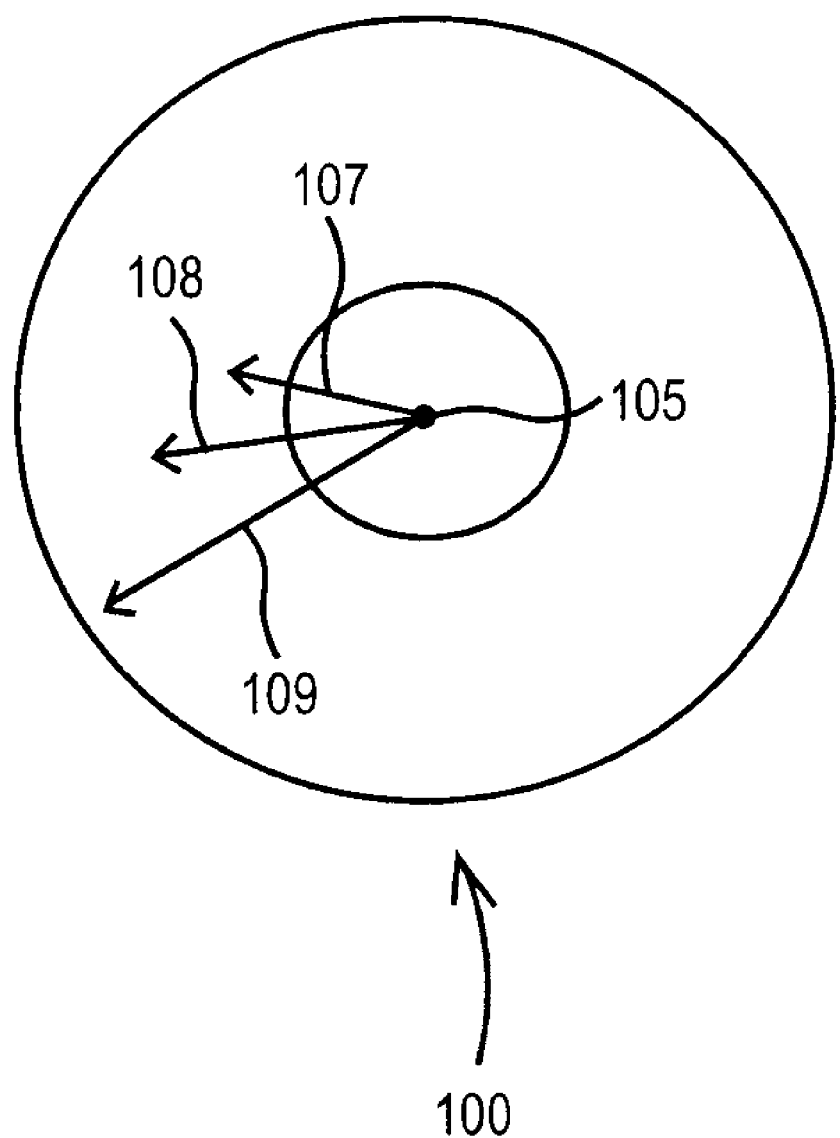
FIG. 1 is top view of Applicants' optical and holographic data storage medium.
Figure 2A:
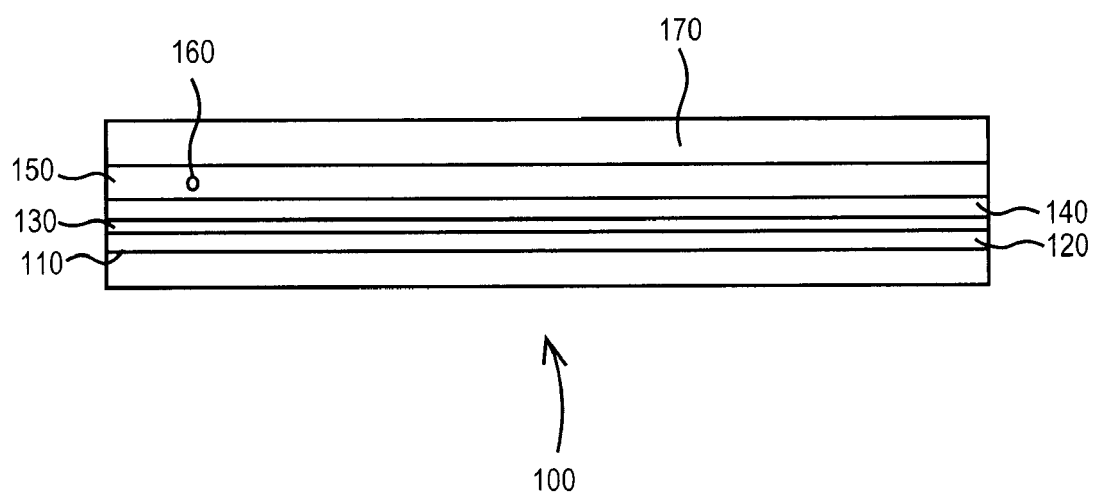
FIG. 2A is a cross-sectional view of one embodiment of the optical and holographic data storage medium of FIG. 1.

FIG. 1 illustrates optical and holographic data storage medium 100 (FIGS. 1, 2A, 2B, 5, 6) comprising geometric center-of-disk 105. Referring now to FIG. 2A, in certain embodiments, Applicants' optical holographic data storage medium 100 comprises optical data storage layer 110. In certain embodiments, optical data storage layer 110 comprises pit regions and non-pit regions formed therein during manufacture. Such pit regions do not reflect incident laser light. The absence of reflected laser light is decoded to mean a "0" for data storage purposes.

Non-pit regions do reflect incident laser light. Detection of such reflected laser light is decoded to mean a "1" for data storage purposes. In certain embodiments, an optical data storage layer comprising a combination of pit regions and non-pit regions comprises read only memory ("ROM"), such as for example and without limitation a CD-ROM, DVD-ROM, BD-ROM, and the like.

In the illustrated embodiment of FIG. 2A, Applicants' optical holographic data storage medium 100 (FIGS. 1, 2A, 2B, 5, 6) further comprises gap layer 120 disposed over optical data storage layer 110. In the illustrated embodiment of FIG. 2A, Applicants' optical holographic data storage medium 100 further comprises dichronic mirror 130 (FIGS. 2A, 2B) disposed over gap layer 120. Applicants' dichronic mirror 130 reflects laser light comprising certain wavelengths, but transmits light having other wavelengths.

By "reflects the laser light" or "is reflected by," Applicants mean that less than about 10 percent of the laser energy incident on Applicants' dichronic mirror is transmitted through that dichronic mirror. By "does not reflect the laser light" or "is not reflected by," Applicants mean that more than about 90 percent of the laser energy incident on Applicants' dichronic mirror is transmitted through that dichronic mirror.

In the illustrated embodiment of FIG. 2A, Applicants' optical holographic data storage medium 100 (FIGS. 1, 2A, 2B, 5, 6) further comprises gap layer 140 disposed over dichronic mirror 130. In the illustrated embodiment of FIG. 2A, Applicants' optical holographic data storage medium 100 further comprises holographic data storage layer 150 disposed over gap layer 140. In the illustrated embodiment of FIG. 2A, Applicants' optical holographic data storage medium 100 further comprises cover layer 170 disposed over holographic data storage layer 150. The illustrated embodiment of FIG. 2A shows hologram 160 (FIGS. 2A, 2B, 5) encoded as an interference pattern within holographic data storage layer 150.

Figure 2B:
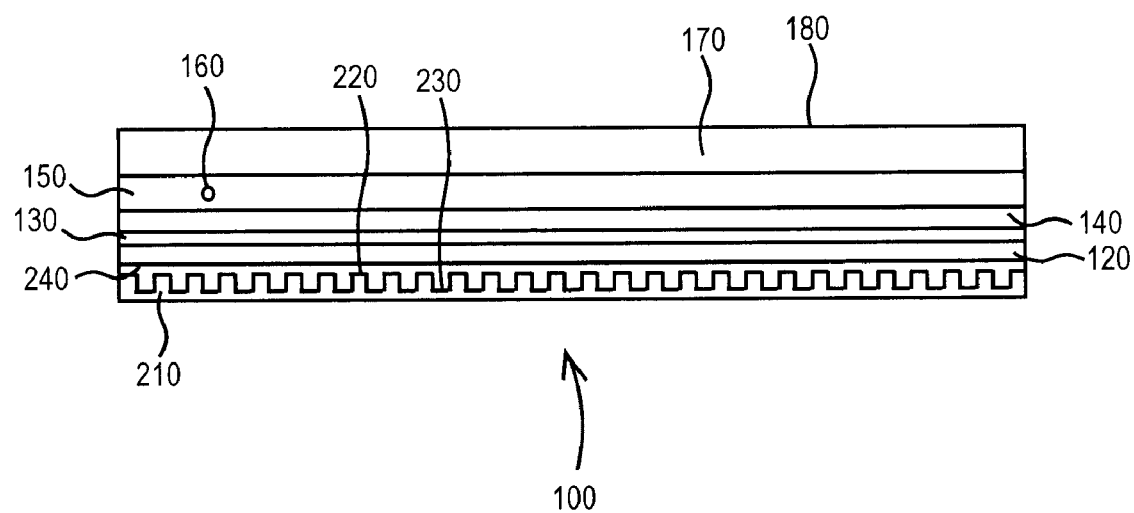
FIG. 2B is a cross-sectional view of a second embodiment of the optical and holographic data storage medium of FIG. 1.

Referring now to FIG. 2B, in certain embodiments which is a radial cross-section of Applicants' optical holographic data storage medium 100 (FIGS. 1, 2A, 2B, 5, 6) comprises tracking assembly 210 which comprises series of alternating lands 220 and grooves 230, wherein a writeable or re-writeable layer 240 is disposed over the alternating lands and grooves. The alternating lands and grooves are used for tracking purposes when writing data to writeable/re-writeable layer 240 and/or holographic data storage layer 150.

In the illustrated embodiment of FIG. 2B, Applicants' optical holographic data storage medium 100 further comprises gap layer 120 disposed over writeable/re-writeable layer 240. In the illustrated embodiment of FIG. 2B, Applicants' optical holographic data storage medium 100 further comprises dichronic mirror 130 disposed over gap layer 120.

In the illustrated embodiment of FIG. 2B, Applicants' optical holographic data storage medium 100 (FIGS. 1, 2A, 2B, 5, 6) further comprises gap layer 140 disposed over dichronic mirror 130, holographic data storage layer 150 disposed over gap layer 140, and cover layer 170 disposed over holographic data storage layer 150. The illustrated embodiment of FIG. 2B shows hologram 160 (FIGS. 2A, 2B, 5) encoded as an interference pattern within holographic data storage layer 150. Outer surface 180 of cover layer 170 may be treated with diamond-like-carbon for increased wear resistance and increased scratch resistance.

Figure 2C:
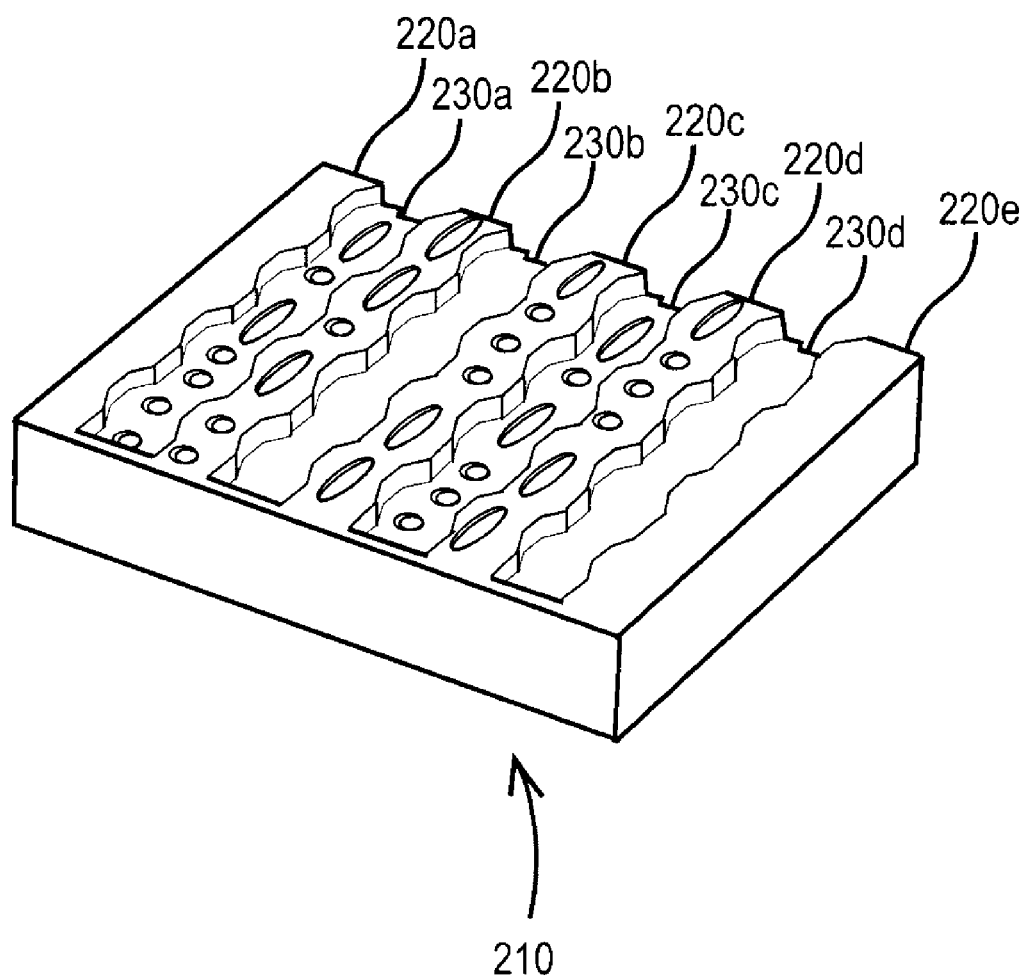
FIG. 2C is a perspective view of a series of alternating lands and grooves disposed in certain embodiments of the optical and holographic data storage medium of FIG. 2B.

Referring now to FIG. 2C, in certain embodiments the tracking assembly 210 comprises a series of "wobbly" lands and grooves, such as lands 220a, 220b, 220c, 220d, and 220e. Those "wobbly" lands are separated by "wobbly" grooves 230a, 230b, 230c, and 230d, respectively.

Figure 5:
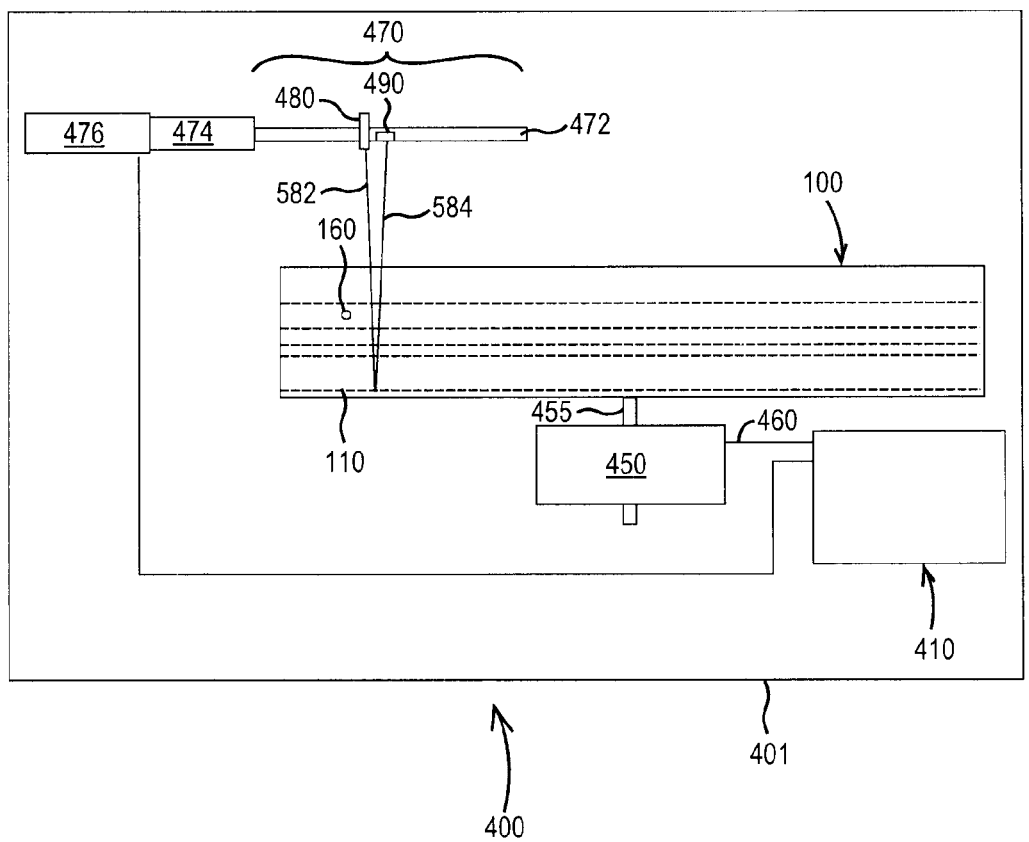
FIG. 5 is a block diagram showing Applicants' optical and holographic drive.

Referring now to FIG. 5, optical holographic data drive 400 (FIGS. 5, 7) comprises housing 401. Optical holographic data storage medium 100 (FIGS. 1, 2A, 2B, 5, 6) can be removeably disposed within housing 401. In the illustrated embodiment of FIG. 5, optical holographic data storage medium 100 is releaseably attached to a drive mechanism comprising drive motor 450 and rotatable shaft 455. Drive motor 450 rotates rotatable shaft 455 thereby causing optical holographic data storage medium 100 to rotate also.

Figure 6:
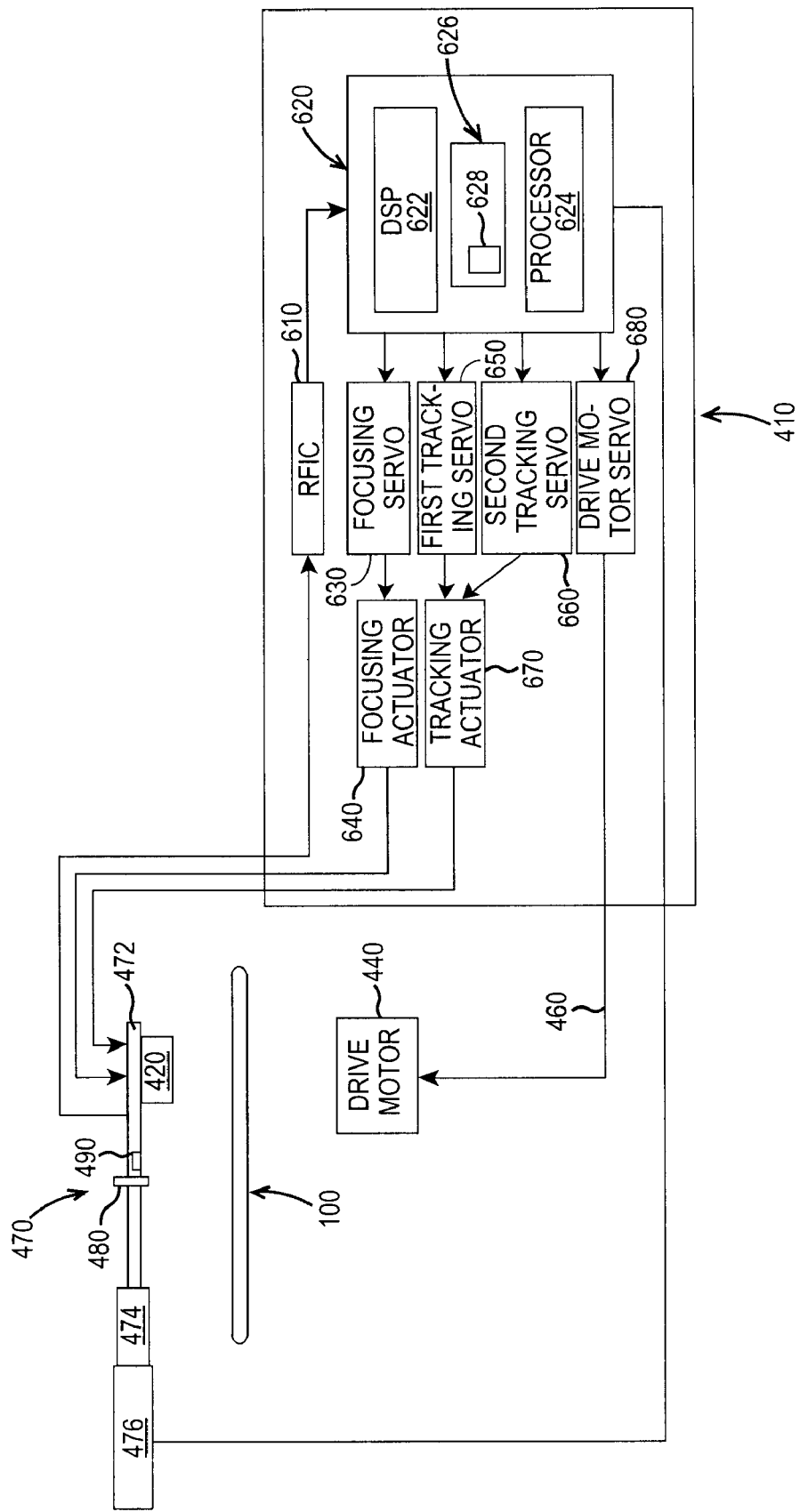
FIG. 6 illustrates a drive controller disposed in the optical and holographic data drive of FIG. 5.

In the illustrated embodiment of FIG. 5, optical holographic data drive 400 (FIGS. 5, 7) further comprises member 472 slidably disposed within member 474, which is slidably disposed within optical head motor 476. Drive controller 410 (FIGS. 5, 6) can cause optical head motor 476 to extend members 474 and 472 outwardly. In the illustrated embodiment of FIG. 5, lasing device 480 (FIGS. 5, 6) and optical sensor 490 (FIGS. 5, 6), are disposed on member 472. Member 472 in combination with lasing device 480 and optical sensor 490 comprise optical head 470 (FIGS. 5, 6). In the illustrated embodiment of FIG. 5, optical holographic data drive 400 (FIGS. 5, 7) further comprises drive controller 410 (FIGS. 5, 6) which communicates with drive motor 450 via control line 460 and optical head motor 476 via control line 499.

In certain embodiments, lasing device 480 (FIGS. 5, 6) emits red laser light. In certain embodiments, lasing device 480 (FIGS. 5, 6) comprises an AlGaInP laser which emits light having a wavelength between about 620-690 nm.

In the illustrated embodiment of FIG. 6, drive controller 410 comprises integrated circuit 610 in communication with optical head 470 (FIGS. 5, 6) and with processor module 620, wherein processor module 620 comprises digital signal processor 622 and microprocessor 624. Drive controller 410 further comprises focusing servo 630, focusing actuator 640, first tracking servo 650, second tracking servo 660, tracking actuator 670, and drive motor servo 680. In certain embodiments, first tracking servo 650 comprises a read-only media tracking servo. In certain embodiments, second tracking servo 660 comprises a writeable media tracking servo.

Drive controller 410 (FIGS. 5, 7) utilizes lasing device 480 to read information encoded in optical data storage layer 110 (FIG. 2A) or 240 (FIG. 2B). Lasing device 480, using laser energy 582, scans optical data storage layer 110 (FIG. 2A) or 240 (FIG. 2B). Dichronic mirror layer 130 (FIGS. 2A, 2B) is transparent to the laser energy 582 provided by lasing device 480, and that laser energy 582 passes through dichronic mirror layer 130 and strikes optical data storage layer 110 (FIG. 2A) or 240 (FIG. 2B). Drive controller 410 (FIGS. 5, 6) causes optical head 470 to move along one or more of the three orthogonal axes, and as optical head 470 moves the laser light 582 incident on optical data storage layer 110 (FIG. 2A) is selectively reflected backwardly as reflected laser light 584. The three orthogonal axes are typically radial, tangential, and vertical, and comprise a cylindrical coordinate system (R,θ, Z). The radial direction is typically associated with optical head 470 seeking across data storage medium 100, and the vertical direction is often associated with focusing the light from lasing device 480. Sensor 490 detects both the presence or absence of reflected laser light 584.

Figure 7:
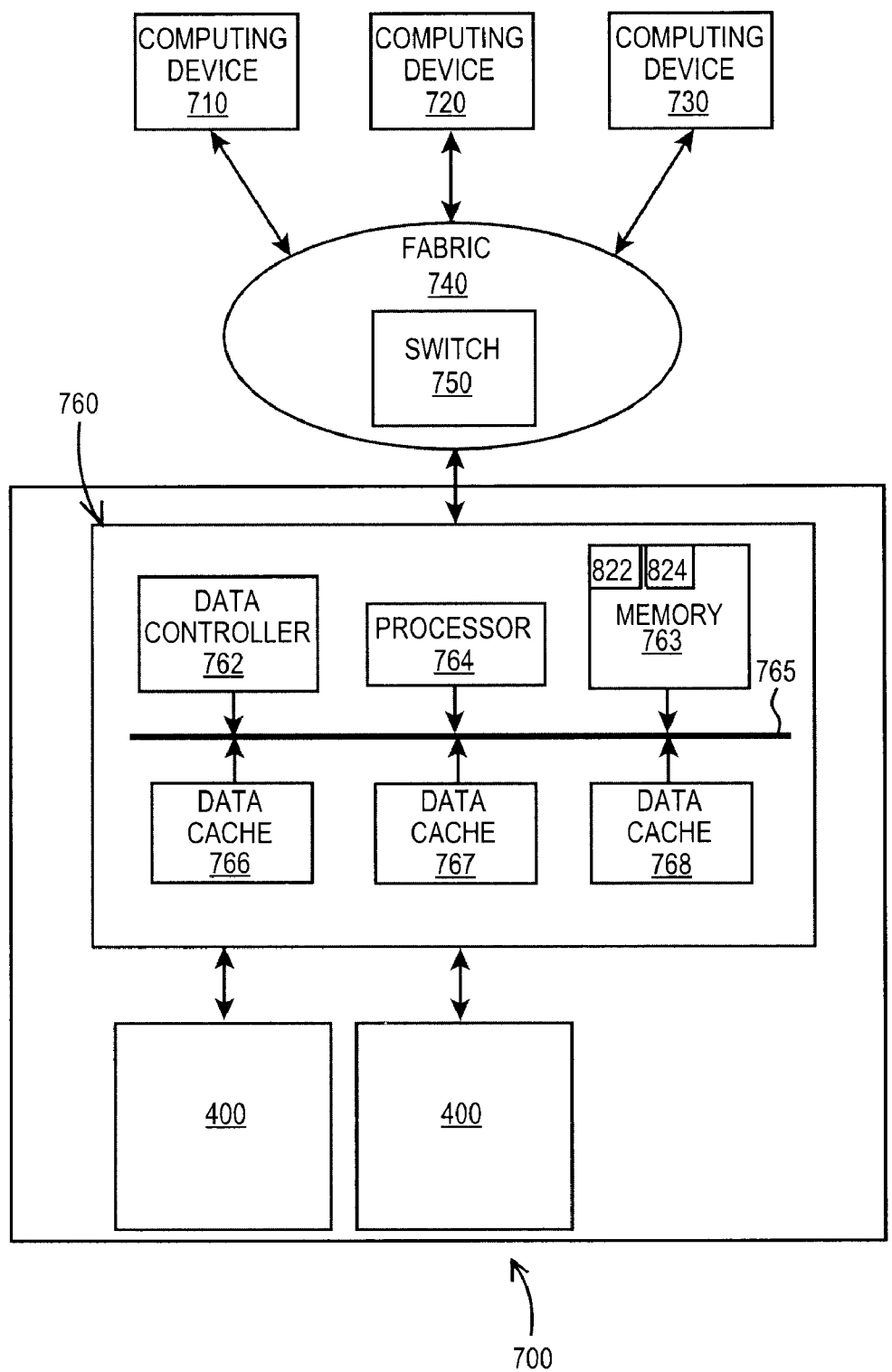
FIG. 7 is a block diagram showing one embodiment of Applicants' data storage and retrieval system.

FIG. 7 illustrates one embodiment of Applicants' data storage and retrieval system 700. In the illustrated embodiment of FIG. 7, data storage and retrieval system 700 communicates with computing devices 710, 720, and 730. In the illustrated embodiment of FIG. 7, computing devices 710, 720, and 730 communicate with storage controller 760 through a data communication fabric 740. In certain embodiments, fabric 740 comprises one or more data switches 750. Further in the illustrated embodiment of FIG. 7, storage controller 760 communicates with one or more holographic data storage systems. In the illustrated embodiment of FIG. 7, data storage and retrieval system 700 comprises optical holographic drive 400 (FIGS. 5, 7).

In certain embodiments, computing devices 710, 720, and 730, are selected from the group consisting of an application server, a web server, a work station, a host computer, or other like device from which information is likely to originate. In certain embodiments, one or more of computing devices 710, 720, and/or 730 are interconnected with fabric 740 using Small Computer Systems Interface ("SCSI") protocol running over a Fibre Channel ("FC") physical layer. In other embodiments, the connections between computing devices 710, 720, and 730, comprise other protocols, such as Infiniband, Ethernet, Gigabit Ethernet, Fibre Channel over Ethernet, or Internet SCSI ("iSCSI"). In certain embodiments, switches 750 are configured to route traffic from the computing devices 710, 720, and/or 730, directly to the storage controller 760.

In the illustrated embodiment of FIG. 7, storage controller 760 comprises a data controller 762, memory 763, microcode 822 and instructions 824 encoded in memory 763, processor 764, and data caches 766, 767, and 768, wherein these components communicate through a data bus 765. In certain embodiments, memory 763 comprises a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

In certain embodiments, the storage controller 760 is configured to read data signals from and write data signals to a serial data bus on one or more of the computing devices 710, 720, and/or 730. Alternatively, in other embodiments the storage controller 760 is configured to read data signals from and write data signals to one or more of the computing devices 710, 720, and/or 730, through the data bus 765 and the fabric 740.

Figure 8:
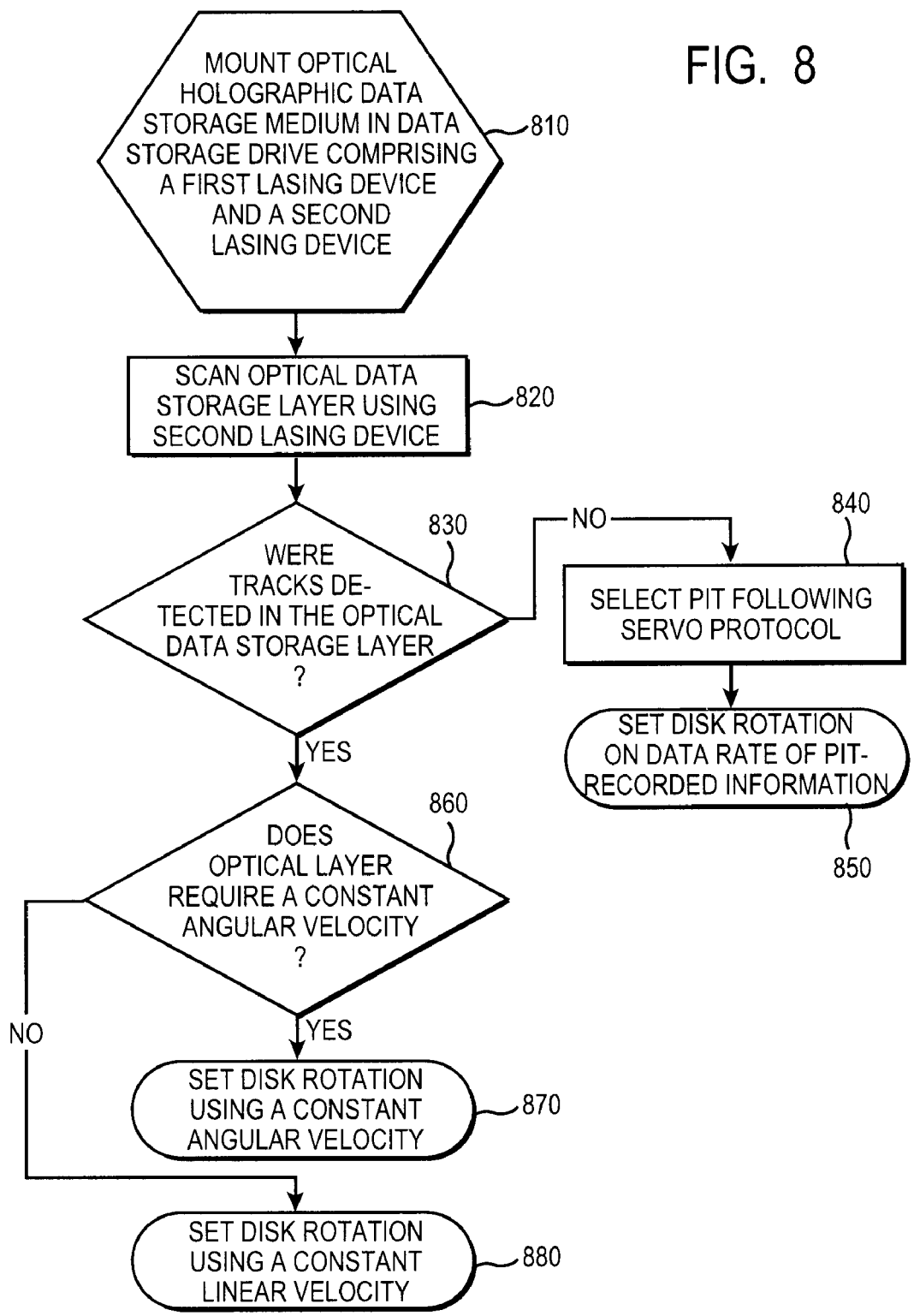
FIG. 8 is a flow chart summarizing the steps of Applicants' method to set a disk rotation rate.

Applicants' invention comprises a method to set a rotation rate for Applicants' optical holographic data storage medium 100 (FIGS. 1, 2A, 2B, 5, 6). FIG. 8 summarizes the steps of Applicants' method.

Referring now to FIG. 8, in step 810 the method mounts the optical holographic data storage medium, such as optical data storage medium 100 (FIGS. 1, 2A, 2B, 5, 6), into a compatible data drive, such as optical holographic data drive 400 (FIGS. 5, 7). The optical holographic data storage medium comprises a holographic data storage layer and an optical data storage layer. In certain embodiments, the optical holographic data storage medium comprises a dichronic mirror, such as dichronic mirror 130, disposed between the holographic data storage layer and the optical data storage layer.

In step 820, the method scans the optical data storage layer with laser light. In certain embodiments, step 820 is performed by lasing device 480 (FIGS. 5, 6) in response to signals from a data drive controller, such as data drive controller 410 (FIGS. 5, 6). In certain embodiments, step 820 is performed by the lasing device 480 in response to signals from a storage controller, such as data drive controller 760 (FIG. 7).

In step 830, the method determines if tracks were detected in the optical data storage layer. In certain embodiments, step 820 is performed by a data drive controller, such as data drive controller 410 (FIGS. 5, 6). In certain embodiments, step 820 is performed by a storage controller, such as data drive controller 760 (FIG. 7).

In step 830, optical head 470 decodes reflected laser light 484 and generates optical data storage layer signals. After the optical data storage layer signals are amplified and processed by integrated circuit 610 (FIG. 6), in step 830 focusing error signals and tracking error signals are input to processor module 620 (FIG. 6).

Processor module 620 analyzes the focusing error signals and tracking error signals, determines the disc type, and computes servo driver signals. Processor 624 (FIG. 6) outputs servo driver signals to focusing servo 630 (FIG. 6), either first tracking servo 650 (FIG. 6) or second tracking servo 660 (FIG. 6), and drive servo 680 (FIG. 6) to control focusing actuator 640 (FIG. 6), tracking actuator 670 (FIG. 6), and drive motor 440 (FIGS. 5, 6), respectively, to ensure accuracy when reading data from either the holographic data storage layer 150 (FIGS. 2A, 2B) and/or the optical data storage layer 110 (FIG. 2A) or 240 (FIG. 2B).

If the method determines in step 830 that tracks were not detected in the optical data storage layer, the method transitions from step 830 to step 840 wherein the method selects a pit-following servo protocol, and generates and provides servo signals to first tracking servo 650 (FIG. 6). In certain embodiments, step 840 is performed by a data drive controller, such as data drive controller 410 (FIGS. 5, 6). In certain embodiments, step 840 is performed by a storage controller, such as data drive controller 760 (FIG. 7).

In step 850, the method computes and provides servo signals to drive motor servo 680 (FIG. 6), wherein drive motor servo 680 sets the disk rotation speed based upon a preselected data acquisition rate for pit-recorded information. In certain embodiments, step 850 is performed by a data drive controller, such as data drive controller 410 (FIGS. 5, 6). In certain embodiments, step 850 is performed by a storage controller, such as data drive controller 760 (FIG. 7).

If the method determines in step 830 that tracks were detected in the optical data storage layer, the method transitions from step 830 to step 860 wherein the method determines if the encoding pattern used in the optical data storage layer requires that the disk be rotated at a constant angular velocity. In certain embodiments, step 860 is performed by a data drive controller, such as data drive controller 410 (FIGS. 5, 6). In certain embodiments, step 860 is performed by a storage controller, such as data drive controller 760 (FIG. 7).

If in step 860 the method determines that the distance between lands and grooves comprising the tracks 210 increases as a function of disk radius, then the method in step 860 determines that that the disk be rotated at a constant angular velocity, and the method transitions from step 860 to step 870 wherein the method generates and provides tracking signals to second tracking servo 660 (FIG. 6), and constant angular velocity servo signals to drive motor servo 680 (FIG. 6) such that drive motor 440 rotates the optical holographic data storage medium of step 810 at a constant angular velocity.

Figure 3:
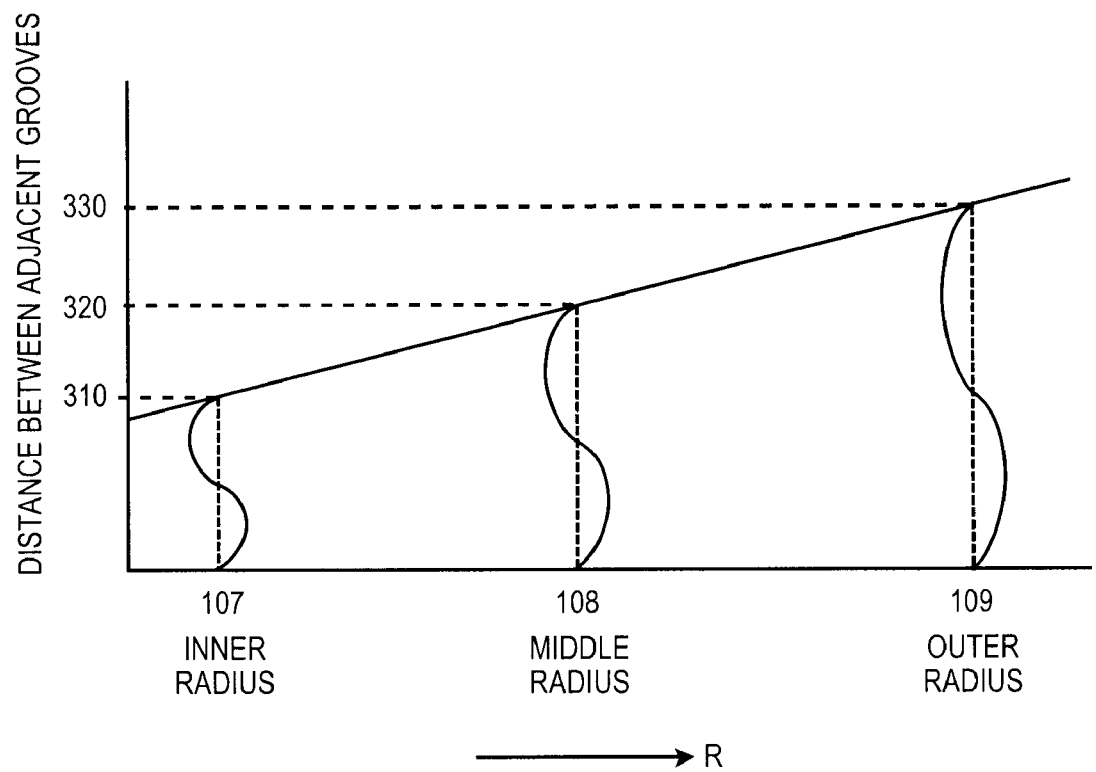
FIG. 3 is a graph illustrating the distance as a function of radius between alternating grooves in one embodiment of the optical and holographic data storage medium of FIG. 2B.

For example, and referring now to FIGS. 1, 2B, and 3, if the method determines that at radius 107 the distance between adjacent track grooves 230 is distance 310, and that that at radius 108 the distance between adjacent track grooves 230 is distance 320, and that that at radius 109 the distance between adjacent track grooves 230 is distance 330, wherein distance 310 is less than distance 320, and wherein distance 320 is less than distance 330, then the method determines in 860 that the encoding pattern used in the optical data storage layer requires that the disk be rotated at a constant angular velocity.

Alternatively, if in step 860 the method determines that the distance between lands and grooves comprising the tracks 210 does not increase as a function of disk radius, then the method transitions from step 860 to step 880 wherein the method generates and provides tracking signals to second tracking servo 660 (FIG. 6), and constant linear velocity servo signals to drive motor servo 680 (FIG. 6) such that drive motor 440 rotates the optical holographic data storage medium of step 810 at a constant linear velocity.

Figure 4:
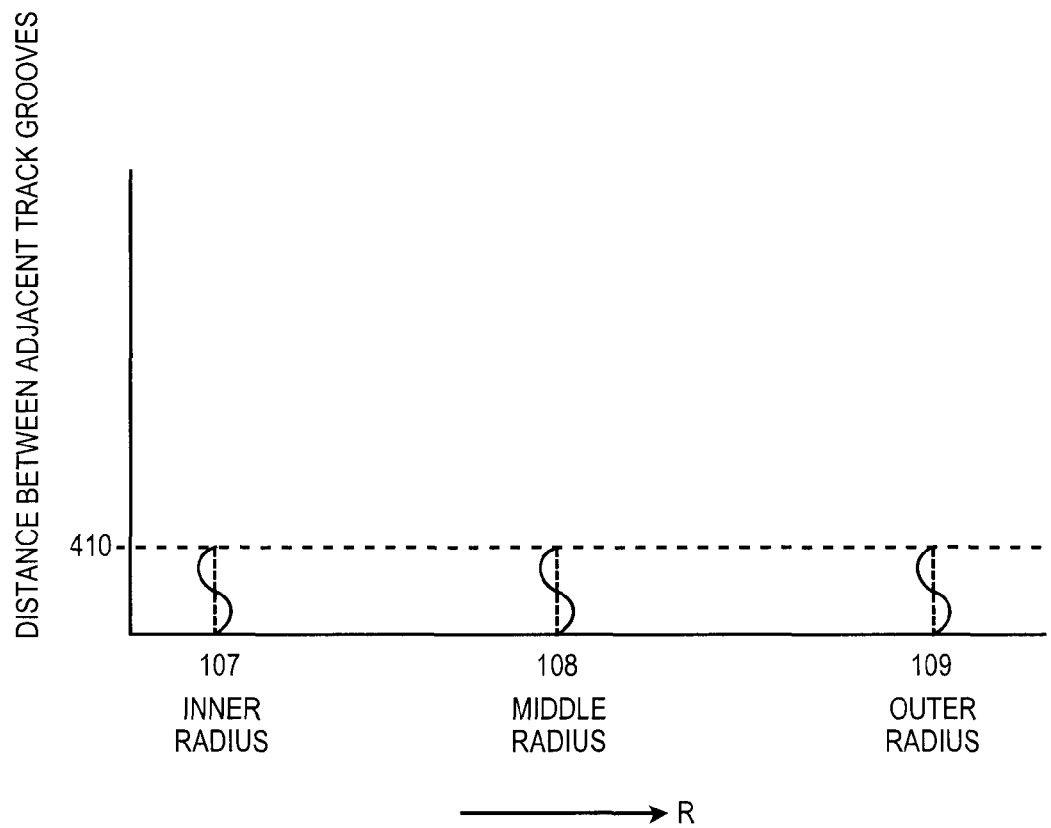
FIG. 4 is a graph illustrating the distance as a function of radius between alternating grooves in a second embodiment of the optical and holographic data storage medium of FIG. 2B.

For example, and referring now to FIGS. 1, 2B, and 4, if the method determines that at radius 107 the distance between adjacent track grooves 230 is distance 410, and that that at radius 108 the distance between adjacent track grooves 230 is distance 410, and that that at radius 109 the distance between adjacent track grooves 230 is distance 410, then the method determines in 860 that the encoding pattern used in the optical data storage layer requires that the disk be rotated at a constant linear velocity.

In certain embodiments, individual steps recited in FIG. 8 may be combined, eliminated, or reordered.

In certain embodiments, Applicants' invention includes instructions, such as instructions 628 (FIG. 6), encoded in memory 626 (FIG. 6) and/or instructions 824 (FIG. 7), encoded in memory 763 (FIG. 7), where those instructions are executed by a processor, such as processor 624 (FIG. 6) and/or processor 764 (FIG. 7), respectively, to perform one or more of steps 820, 830, 840, 850, 860, 870, and/or 880, recited in FIG. 8.

In certain embodiments, Applicants' invention includes instructions residing in any other computer program product, where those instructions are executed by a computer external to, or internal to optical holographic data drive 400 (FIGS. 5, 7), and/or data storage and retrieval system 700 (FIG. 7), to perform one or more of steps 820, 830, 840, 850, 860, 870, and/or 880, recited in FIG. 8. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to set a rotation rate for an optical holographic data storage medium comprising a center point, a holographic data storage layer, and an optical data storage layer, comprising the steps of:
    disposing said optical holographic data storage medium in an optical holographic data storage drive comprising a lasing device for emitting laser light comprising a wavelength, and an optical detector for detecting said laser light, wherein said laser light is not reflected by said holographic data storage layer;
    determining if said optical storage layer comprises an alternating series of lands and grooves;
    wherein if said optical storage layer comprises an alternating series of lands and grooves, determining if the distance between alternating grooves increases as a function of the distance from said center point;
    wherein if the distance between alternating grooves increases as a function of the distance from said center point, rotating said optical holographic data storage medium at a constant angular velocity.

2. The method of claim 1, wherein said wavelength is greater than about 600 nanometers.

3. The method of claim 1, further comprising the steps of:
    wherein if the distance between alternating grooves increases as a function of the distance from said center point, generating tracking servo signals and drive servo signals by a processor disposed in said optical holographic data storage drive;
    providing said tracking servo signals to a writeable media tracking servo disposed in said optical holographic data storage drive;
    providing said drive servo signals to a drive motor servo disposed in said optical holographic data storage drive, wherein said drive motor servo causes a drive motor disposed in said optical holographic data storage drive to rotate said optical holographic data storage medium at a constant angular velocity.

4. The method of claim 1, further comprising the step of rotating said optical holographic data storage medium at a constant linear velocity if the distance between alternating grooves does not increase as a function of the distance from said center point.

5. The method of claim 4, further comprising the steps of:
    generating tracking servo signals and drive servo signals by a processor disposed in said optical holographic data storage drive;
    providing said tracking servo signals to a writeable media tracking servo disposed in said optical holographic data storage drive;
    providing said drive servo signals to a drive motor servo disposed in said optical holographic data storage drive, wherein said drive motor servo causes a drive motor disposed in said optical holographic data storage drive to rotate said optical holographic data storage medium at a constant linear velocity.

6. The method of claim 1, further comprising the steps of:
    wherein if said optical storage layer does not comprise an alternating series of lands and grooves, establishing a data acquisition rate for pit-recorded information;
    rotating said optical holographic data storage medium at a rotation rate based upon said data acquisition rate for pit-recorded information.

7. The method of claim 6, further comprising the steps of:
    generating tracking servo signals and drive servo signals by a processor disposed in said optical holographic data storage drive;
    providing said tracking servo signals to a read-only media tracking servo disposed in said optical holographic data storage drive;
    providing said drive servo signals to a drive motor servo disposed in said optical holographic data storage drive, wherein said drive motor servo causes a drive motor disposed in said optical holographic data storage drive to rotate said optical holographic data storage medium at a rotation rate based upon said data acquisition rate for pit-recorded information.

8. An article of manufacture comprising a processor, a lasing device for emitting laser light comprising a wavelength, an optical detector for detecting said laser light, and a computer readable medium having computer readable program code disposed therein to set a rotation rate for an optical holographic data storage medium comprising a center point, a holographic data storage layer, and an optical data storage layer, wherein said laser light is not reflected by said holographic data storage layer, the computer readable program code comprising a series of computer readable program steps to effect:
    determining if said optical storage layer comprises an alternating series of lands and grooves;
    wherein if said optical storage layer comprises an alternating series of lands and grooves, determining if the distance between alternating grooves increases as a function of the distance from said center point;
    wherein if the distance between alternating grooves increases as a function of the distance from said center point, rotating said optical holographic data storage medium at a constant angular velocity.

9. The article of manufacture of claim 8, wherein said wavelength is greater than about 600 nanometers.

10. The article of manufacture of claim 8, said computer readable program code further comprising a series of computer readable program steps to effect:
   wherein if the distance between alternating grooves increases as a function of the distance from said center point, generating tracking servo signals and drive servo signals by a processor disposed in said optical holographic data storage drive;
   providing said tracking servo signals to a writeable media tracking servo disposed in said optical holographic data storage drive;
   providing said drive servo signals to a drive motor servo disposed in said optical holographic data storage drive, wherein said drive motor servo causes a drive motor disposed in said optical holographic data storage drive to rotate said optical holographic data storage medium at a constant angular velocity.

11. The article of manufacture of claim 8, said computer readable program code further comprising a series of computer readable program steps to effect rotating said optical holographic data storage medium at a constant linear velocity if the distance between alternating grooves does not increase as a function of the distance from said center point.

12. The article of manufacture of claim 11, wherein the computer readable program code to rotate said optical holographic data storage medium at a constant linear velocity further comprises a series of computer readable program steps to effect:
   generating tracking servo signals and drive servo signals by a processor disposed in said optical holographic data storage drive;
   providing said tracking servo signals to a writeable media tracking servo disposed in said optical holographic data storage drive;
   providing said drive servo signals to a drive motor servo disposed in said optical holographic data storage drive, wherein said drive motor servo causes a drive motor disposed in said optical holographic data storage drive to rotate said optical holographic data storage medium at a constant linear velocity.

13. The article of manufacture of claim 8, said computer readable program code further comprising a series of computer readable program steps to effect:
   wherein if said optical storage layer does not comprise an alternating series of lands and grooves, establishing a data acquisition rate for pit-recorded information;
   rotating said optical holographic data storage medium at a rotation rate based upon said data acquisition rate for pit-recorded information.

14. The article of manufacture of claim 13, said computer readable program code further comprising a series of computer readable program steps to effect:
   generating tracking servo signals and drive servo signals by a processor disposed in said optical holographic data storage drive;
   providing said tracking servo signals to a read-only media tracking servo disposed in said optical holographic data storage drive;
   providing said drive servo signals to a drive motor servo disposed in said optical holographic data storage drive, wherein said drive motor servo causes a drive motor disposed in said optical holographic data storage drive to rotate said optical holographic data storage medium at a rotation rate based upon said data acquisition rate for pit-recorded information.

15. A computer program product stored on a non-transitory computer readable medium, said computer program product being useable to set a rotation rate for an optical holographic data storage medium comprising a center point, a holographic data storage layer, and an optical data storage layer, using an optical holographic data storage drive comprising a lasing device capable of emitting laser light comprising a wavelength, an optical detector for detecting said laser light, wherein said laser light is not reflected by said holographic data storage layer, comprising:
   computer readable program code which causes said programmable computer processor to determine if said optical storage layer comprises an alternating series of lands and grooves;
   computer readable program code which, if said optical storage layer comprises an alternating series of lands and grooves, causes said programmable computer processor to determine if the distance between alternating grooves increases as a function of the distance from said center point;
   computer readable program code which, if the distance between alternating grooves increases as a function of the distance from said center point, causes said programmable computer processor to rotate said optical holographic data storage medium at a constant angular velocity.

16. The computer program product of claim 15, wherein the computer readable code which causes said programmable computer processor to rotate said optical holographic data storage medium at a constant angular velocity further comprises:
   computer readable program code which causes said programmable computer processor to generate tracking servo signals and drive servo signals by a processor disposed in said optical holographic data storage drive;
   computer readable program code which causes said programmable computer processor to provide said tracking servo signals to a writeable media tracking servo disposed in said optical holographic data storage drive;
   computer readable program code which causes said programmable computer processor to provide said drive servo signals to a drive motor servo disposed in said optical holographic data storage drive, wherein said drive motor servo causes a drive motor disposed in said optical holographic data storage drive to rotate said optical holographic data storage medium at a constant angular velocity.

17. The computer program product of claim 15, further comprising computer readable program code which causes said programmable computer processor to rotate said optical holographic data storage medium at a constant linear velocity if the distance between alternating grooves does not increase as a function of the distance from said center point.

18. The computer program product of claim 17, wherein the computer readable program code which causes said programmable computer processor to rotate said optical holographic data storage medium at a constant linear velocity further comprises:
   computer readable program code which, if the distance between alternating grooves does not increase as a function of the distance from said center point, causes said programmable computer processor to generate tracking servo signals and drive servo signals by a processor disposed in said optical holographic data storage drive;

computer readable program code which causes said programmable computer processor to provide said tracking servo signals to a writeable media tracking servo disposed in said optical holographic data storage drive;

computer readable program code which causes said programmable computer processor to provide said drive servo signals to a drive motor servo disposed in said optical holographic data storage drive, wherein said drive motor servo causes a drive motor disposed in said optical holographic data storage drive to rotate said optical holographic data storage medium at a constant linear velocity.

19. The computer program product of claim 15, further comprising:

computer readable program code which, if said optical storage layer does not comprise an alternating series of lands and grooves, causes said programmable computer processor to retrieve a pre-determined data acquisition rate for pit-recorded information;

computer readable program code which causes said programmable computer processor to rotating said optical holographic data storage medium at a rotation rate based upon said data acquisition rate for pit-recorded information.

20. The computer program product of claim 19, further comprising:

computer readable program code which causes said programmable computer processor to generate tracking servo signals and drive servo signals by a processor disposed in said optical holographic data storage drive;

computer readable program code which causes said programmable computer processor to provide said tracking servo signals to a read-only media tracking servo disposed in said optical holographic data storage drive;

computer readable program code which causes said programmable computer processor to providing said drive servo signals to a drive motor servo disposed in said optical holographic data storage drive, wherein said drive motor servo causes a drive motor disposed in said optical holographic data storage drive to rotate said optical holographic data storage medium at a rotation rate based upon said data acquisition rate for pit-recorded information.

* * * * *